US010786810B2

(12) United States Patent
Izumo et al.

(10) Patent No.: US 10,786,810 B2
(45) Date of Patent: Sep. 29, 2020

(54) MULTICHANNEL PIPETTE

(71) Applicant: A&D COMPANY, LIMITED, Tokyo (JP)

(72) Inventors: Naoto Izumo, Saitama (JP); Hisanori Oda, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 274 days.

(21) Appl. No.: 15/774,911

(22) PCT Filed: Jan. 7, 2016

(86) PCT No.: PCT/JP2016/050333
§ 371 (c)(1),
(2) Date: May 9, 2018

(87) PCT Pub. No.: WO2017/119097
PCT Pub. Date: Jul. 13, 2017

(65) Prior Publication Data
US 2018/0318824 A1    Nov. 8, 2018

(51) Int. Cl.
*B01L 3/02* (2006.01)
*G01N 1/00* (2006.01)
(Continued)

(52) U.S. Cl.
CPC .......... *B01L 3/0224* (2013.01); *B01L 3/0217* (2013.01); *B01L 3/54* (2013.01); *B01L 9/54* (2013.01);
(Continued)

(58) Field of Classification Search
None
See application file for complete search history.

(56) References Cited

U.S. PATENT DOCUMENTS 4,249,419 A * 2/1981 Thomas ................ B01L 3/0279
422/932
4,276,048 A * 6/1981 Leaback .............. B01J 19/0093
422/504
(Continued)

FOREIGN PATENT DOCUMENTS

JP         62-57654 A      3/1987
JP         8-229414 A      9/1996
(Continued)

OTHER PUBLICATIONS

International Search Report and Written Opinion dated Apr. 5, 2016 in the corresponding application PCT/JP2016/050333.

*Primary Examiner* — Marc C Howell
*Assistant Examiner* — Brittany I Fisher
(74) *Attorney, Agent, or Firm* — Roberts Calderon Safran & Cole P.C.

(57) ABSTRACT

Provided is a multichannel pipette whose number of channels can be arbitrarily set and managed to improve usability of the multichannel pipette and improve productivity, quality control, and maintainability in a research site. A multichannel pipette includes a pipette main body, a lower part attached to a lower end portion of the pipette main body, and a plurality of chip holder units housed inside the lower part, wherein each of the chip holder units has a connecting portion attachable to and removable from any of a plurality of to-be-connected portions provided in a unit case inside the lower part, and each of the chip holder units is attachable to and removable from the lower part.

10 Claims, 10 Drawing Sheets

(51) Int. Cl.
*B01L 3/00* (2006.01)
*B01L 9/00* (2006.01)

(52) U.S. Cl.
CPC .......... *G01N 1/00* (2013.01); *B01L 2200/028* (2013.01); *B01L 2200/087* (2013.01); *B01L 2300/027* (2013.01); *B01L 2300/0832* (2013.01); *B01L 2400/0478* (2013.01)

(56) References Cited

U.S. PATENT DOCUMENTS

| | | | | |
|---|---|---|---|---|
| 4,459,864 | A * | 7/1984 | Cirincione | G01N 35/1072 222/137 |
| 4,591,072 | A * | 5/1986 | Oshikubo | B01L 3/0234 222/287 |
| 4,779,467 | A * | 10/1988 | Rainin | B01L 3/0279 422/513 |
| 5,061,449 | A * | 10/1991 | Torti | B01L 3/0217 422/525 |
| 6,732,598 | B2 * | 5/2004 | Schoeppe | B01L 3/0279 73/864.14 |
| 8,057,756 | B2 * | 11/2011 | Londo | B01L 3/0227 422/500 |
| 2001/0043885 | A1 * | 11/2001 | Wanner | B01L 3/0231 422/501 |
| 2006/0099115 | A1 * | 5/2006 | Sandberg | B01L 3/0275 422/400 |
| 2014/0199216 | A1 | 7/2014 | Moriartry et al. | |
| 2017/0028397 | A1 * | 2/2017 | Dudek | B01L 3/0231 |

FOREIGN PATENT DOCUMENTS

| | | |
|---|---|---|
| JP | 2002-537978 A | 11/2002 |
| JP | 2007-279006 A | 10/2007 |
| RU | 1393476 A1 | 5/1988 |

\* cited by examiner

Fig. 7
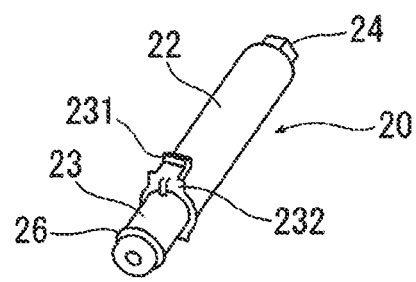
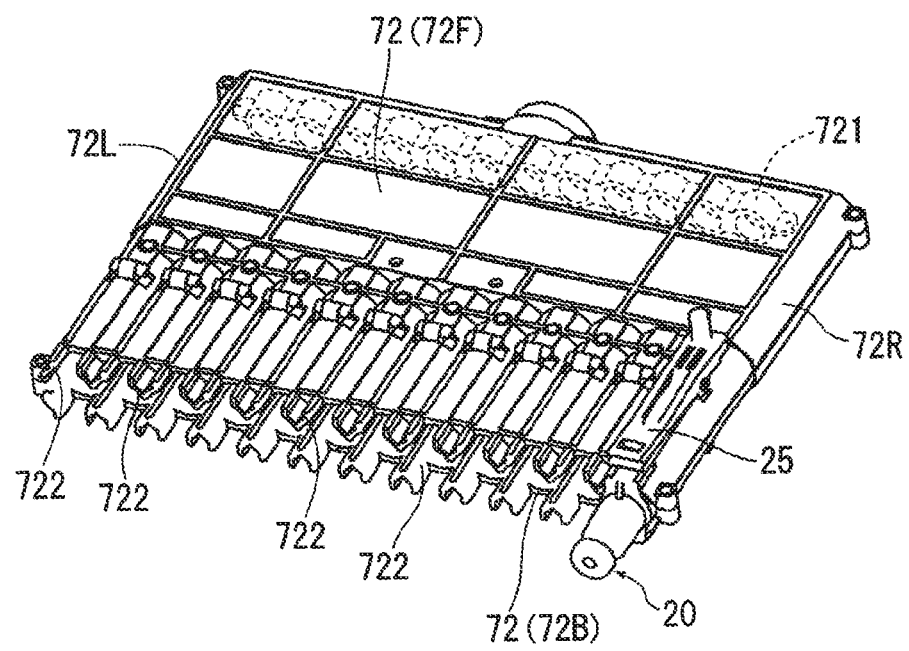

Fig. 8 ( a )
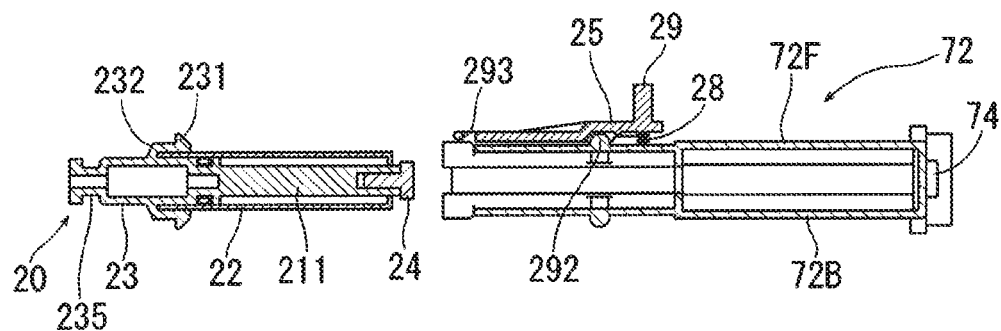
Fig. 8 ( b )
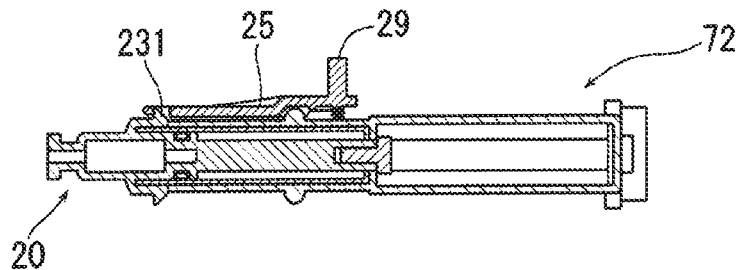
Fig. 8 ( c )
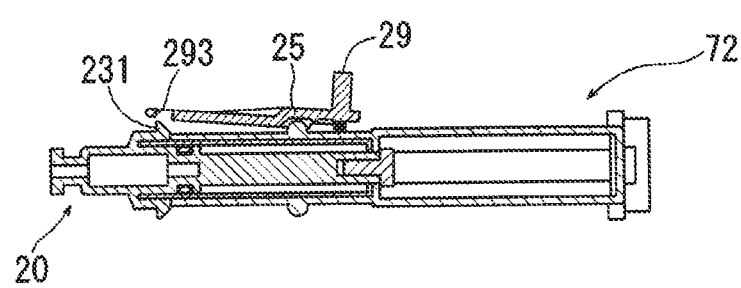

Fig. 9
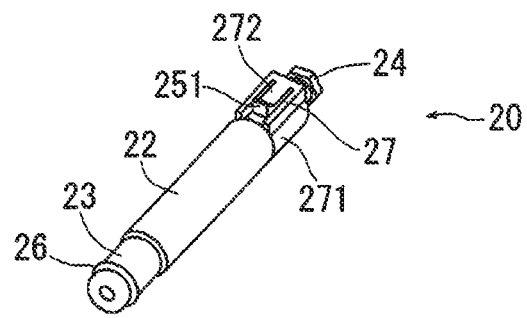
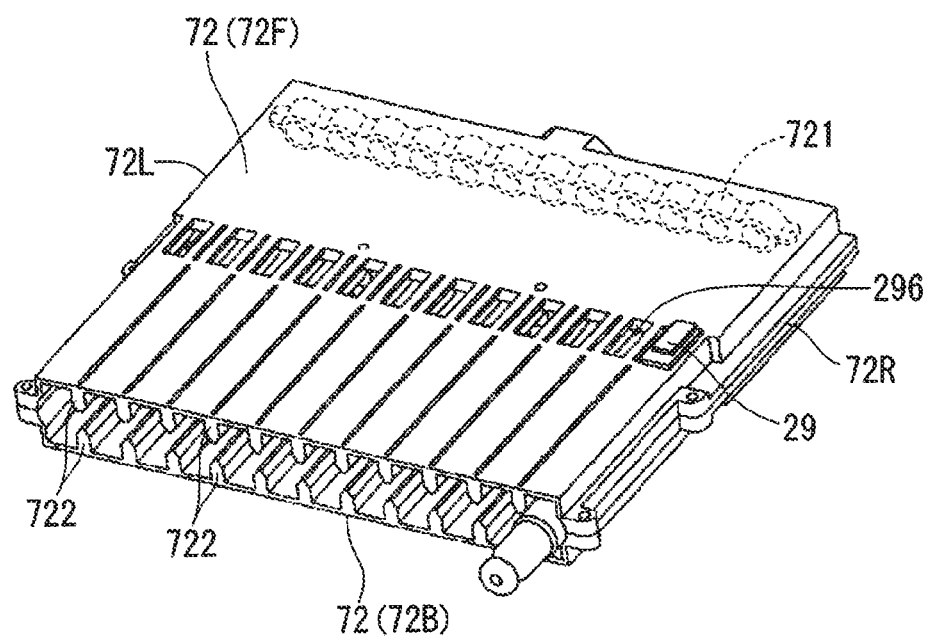

MULTICHANNEL PIPETTE

CROSS-REFERENCE TO RELATED APPLICATIONS

The present application is a U.S. National Phase of PCT/JP2016/050333 filed on Jan. 7, 2016. The disclosure of the PCT Application is hereby incorporated by reference into the present Application.

TECHNICAL FIELD

The present invention relates to a multichannel pipette, and particularly, to a portion including a cylinder, a piston, and a chip holder of the multichannel pipette, and a peripheral portion thereof.

BACKGROUND ART

A pipette is a measuring instrument to discharge a fixed volume of a liquid, which regards a volumetric change caused by movement of a movable piston in a cylinder as an air volume change, sucks a liquid with a volume corresponding to the air volume change into a chip attached to a lower end portion of the cylinder and discharges the liquid. A type to which one chip is attached is called a single pipette, and a type to which a plurality of chips are simultaneously attached is called a multichannel pipette or a multi pipette.

Generally, in a multichannel pipette, chip attaching portions (chip holders) are set as 8 channels or 12 channels. This is because a microtiter plate that is most frequently used as a container into which a liquid is dispensed includes 8×12 wells, and a microtiter plate of 96 wells or more also includes wells with an integral multiple of 96 wells.

A multichannel pipette includes a pipette main body which houses a drive section that moves a piston, and a lower part attached to a lower end portion of the pipette main body. Inside the lower part, portions (chip holder units) each including the cylinder, piston, and chip holder are juxtaposed at a number corresponding to the number of chips, and the plurality of chip holder units are housed integrally (refer to Non-Patent Literatures 1 and 2).

CITATION LIST

Non-Patent Literatures

Non-Patent Literature 1:
http://japan.mt.com/jp/ja/home/products/pipettes/electronic-pipettes/multichannel-pipettes.html (searched on Nov. 6, 2015)
Non-Patent Literature 2:
http://www.gilson.com/Resources/Pipetman_Concept_Users_Guide_English.pdf (searched on Nov. 6, 2015)

SUMMARY OF THE INVENTION

Technical Problem

In a site using a pipette, according to accuracy, production efficiency, and a volume of a liquid to be dispensed, etc., required for dispensing for each purpose, the required number of wells into which a liquid is desired to be dispensed at a time differs, so that it has been desired to select the number of channels of the pipette. However, in a conventional multichannel pipette, the number of channels set by a manufacturer could not be changed.

In addition, a multichannel pipette is used by simultaneously attaching and simultaneously removing a plurality of chips thereto and therefrom, so that attachment/removal of the chips needs a stronger force than in a single pipette, and secure attachment is difficult. Therefore, as it is being used, trouble occurred in which the chip attaching portion repeatedly slid with the chip and was worn and broken, and air leaked from a small flaw and a planned volume could not be dispensed, etc. In the constitution of the conventional multichannel pipette, 8 or 12 chip holder units are integrally housed inside a lower part, so that even when the above-described trouble occurred, a trouble occurring unit or a trouble occurring part could not be replaced or maintained alone. Therefore, the pipette had to be repaired by a manufacturer, and there were problems that much time and cost were taken for the repair.

The present invention has been made based on the problems of the conventional art, and an object thereof is to provide a multichannel pipette whose number of channels can be arbitrarily set and managed to improve usability of the multichannel pipette and improve productivity, quality control, and maintainability in a research site.

Solution to Problem

To solve the problems described above, a multichannel pipette according to an aspect of the present invention includes a pipette main body, a lower part attached to a lower end portion of the pipette main body, and a plurality of chip holder units housed inside the lower part, wherein each of the chip holder units has a connecting portion attachable to and removable from any of a plurality of to-be-connected portions provided in a unit case inside the lower part, and each of the chip holder units is attachable to and removable from the lower part.

A multichannel pipette according to another aspect of the present invention includes a pipette main body that houses a drive section to operate a piston, a lower part attached to a lower end portion of the pipette main body, a unit case having a movable portion provided inside the lower part and joined to a lower end portion of the drive section, and a plurality of chip holder units housed in the unit case and each including the piston, a cylinder with which the piston slides, a chip holder attached to a lower end portion of the cylinder, and a connecting portion attachable to and removable from any of a plurality of to-be-connected portions provided in the movable portion.

In the aspect described above, it is also preferable that a convex switch that is biased by an elastic member radially outward of the chip holder unit is formed on an outer circumferential surface of the chip holder unit, and a plurality of switch window portions to allow pressing on the switches are formed in the lower part.

In the aspect described above, it is also preferable that the switch is provided on a switch forming member provided on the outer circumferential surface of the chip holder unit, a projecting engagement portion extending radially outward of the chip holder unit is formed on an outer circumferential surface of the switch forming member, and a guide portion that guides the projecting engagement portion in the up-down direction is formed on the unit case.

In the aspect described above, it is also preferable that, on a front face and/or a rear face of the unit case, switch forming members are provided, on the switch forming member, a convex switch to be biased by an elastic member radially outward of the chip holder unit is formed at one end portion, and an engagement hole is formed at the other end portion, on the chip holder unit, a chip-holder-side claw portion that engages in the engagement hole at the time of biasing by the elastic member is formed, and in the lower part, switch window portions to allow pressing on the switches are formed.

In the aspect described above, it is also preferable that openings to hold sliding switches are formed in the front face and/or a rear face of the unit case, on a rear face of the switch, a pressing convex portion convex radially inward of the chip holder unit is formed, on a rear face of an opening end portion of the opening in a sliding direction of the switch, a case-side claw portion convex radially inward of the chip holder unit is formed, on the chip holder unit, a chip-holder-side claw portion that warps in a radial direction of the chip holder unit is formed, and in the lower part, switch window portions to allow pressing on the switches are formed.

In the aspect described above, it is also preferable that a lip packing having a substantially U-shaped section is provided at a lower end portion of the chip holder.

In the aspect described above, it is also preferable that the connecting portion and the to-be-connected portion are connected by a magnetic force.

Effect of the Invention

According to the present invention, since the number of channels of a multichannel pipette can be arbitrarily set by using the function of the freely-removable chip holders, usability and maintainability of the multichannel pipette can be improved.

BRIEF DESCRIPTION OF THE DRAWINGS

FIG. 7 is a perspective view showing a unit case and a chip holder unit according to a second embodiment.

FIGS. 8 (a), (b) and (c) are sectional views describing interference between the unit case and the chip holder unit shown in FIG. 7, and FIG. 8(a) is a view showing a state where the chip holder unit is removed from the unit case, FIG. 8(b) is a view showing a state where the chip holder unit is attached to the unit case, and FIG. 8(c) is a view showing a state where interference between the chip holder unit and the unit case is released.

FIG. 9 is a perspective view showing a unit case and a chip holder unit according to a third embodiment.

FIG. 10(a) shows a state where the chip holder unit is removed from the unit case, FIG. 10(b) shows a state where the chip holder unit is attached to the unit case, and FIG. 10(c) shows a state where the interference between the chip holder unit and the unit case is released.

DESCRIPTION OF EMBODIMENTS

Next, preferred embodiments of the present invention are described with reference to the drawings.

First Embodiment (Whole Pipette)

Figure 1:
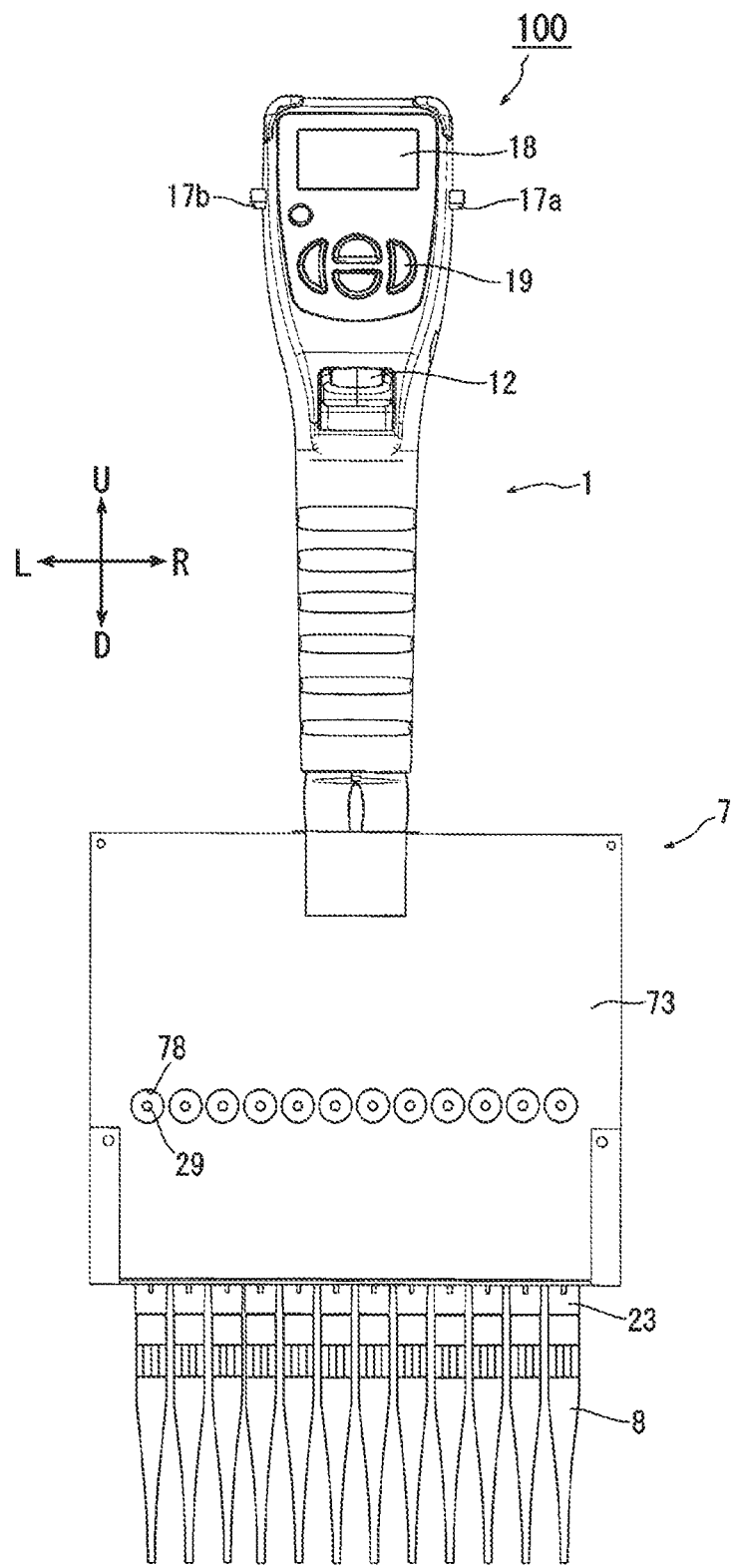
FIG. 1 is a front view of a multichannel pipette according to an embodiment.
Figure 2:
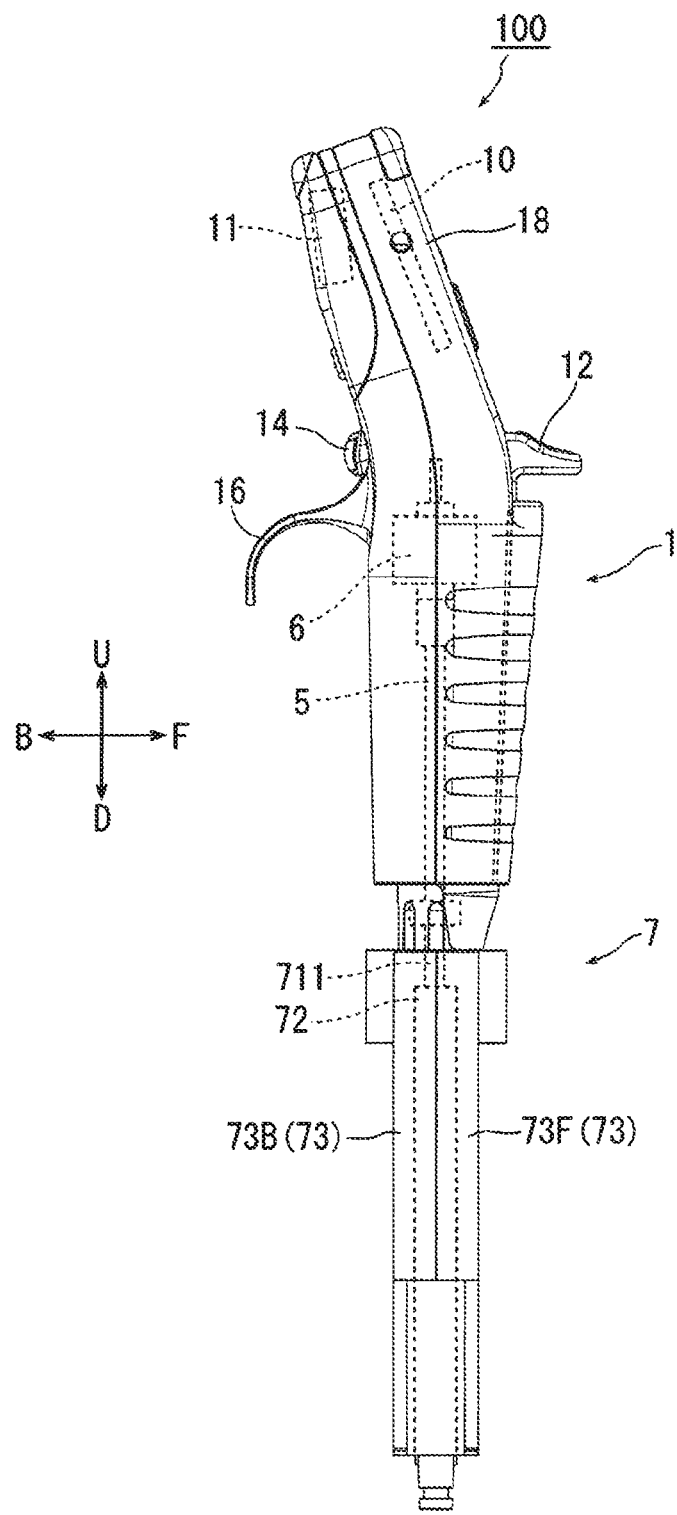
FIG. 2 is a left side view of FIG. 1.

FIG. 1 is a front (front face) view of a multichannel pipette according to an embodiment, and FIG. 2 is a left side view of FIG. 1. In this description, the front-rear direction, the left-right direction, and the up-down direction are shown as the direction of F-B, the direction of L-R, and the direction of U-D in the drawings.

A reference sign 100 in FIG. 1 denotes a multichannel pipette according to the present embodiment, and a reference sign 1 denotes a pipette main body. As shown in FIG. 2, the pipette main body 1 includes, inside a cylindrical case long in a longitudinal direction, a feed screw (ball screw) 5, a stepping motor 6 (drive section) that rotationally drives the feed screw 5 in both forward and reverse directions, an electrical board 10, and a battery 11.

On a front face of the pipette main body 1, a display section 18 and operation keys 19 are provided (FIG. 1). By the operation keys 19, a dispensing volume and a dispensing mode, etc., can be set. Below the operation keys 19, an eject button 12 to be operated to remove chips is provided (FIG. 2). The eject button 12 is mechanically joined to an ejector cover 73 described below (FIG. 2). A spring is inserted between a shaft portion 71 described below and the ejector cover 73, and when the eject button 12 is pressed down against a biasing force of this spring, the ejector cover 73 presses chips 8 (FIG. 1) down, and accordingly, the chips 8 are removed.

On a rear face of the pipette main body 1, an operation key 14 to perform a dispensing operation is provided (FIG. 2). Below the operation key 14, a finger hook 16 that assists supporting at the time of operation and serves as a stopper when no operation is performed, is provided (FIG. 2). On left and right side faces of the pipette main body 1, a pair of charging station electrodes (+)17a and (−)17b for electric conduction to an external charger to charge the battery 11 are provided (FIG. 2).

(Lower Part)

Figure 3:
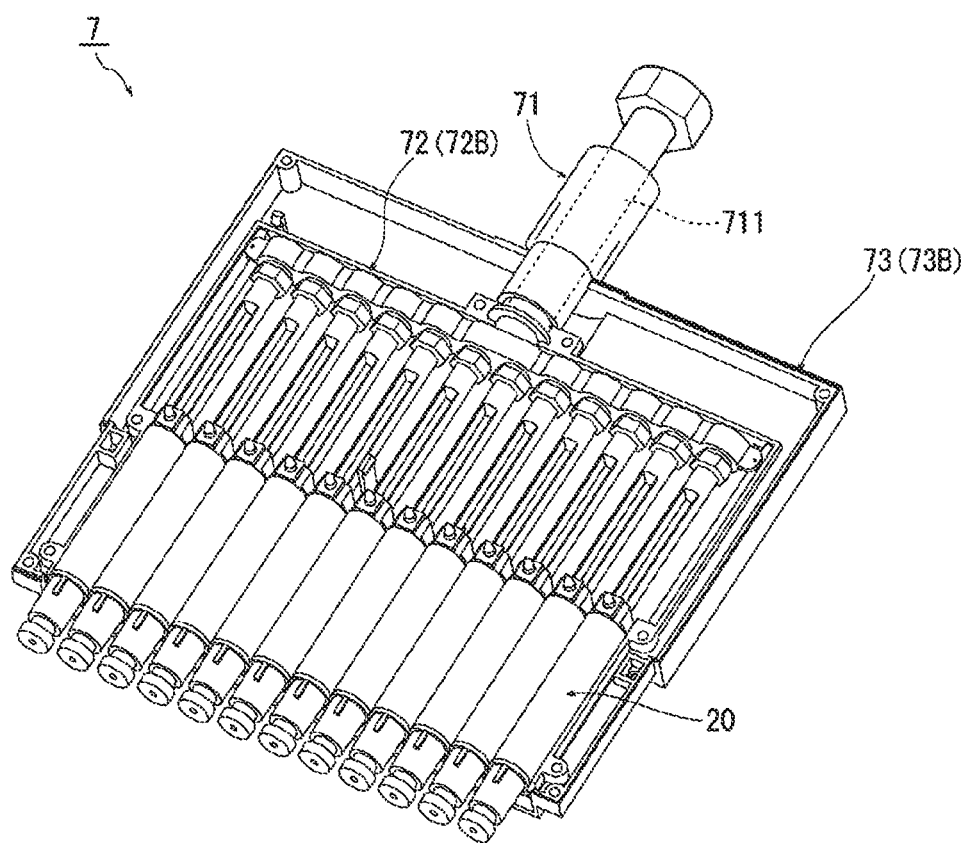
FIG. 3 is a perspective view showing the inside of a lower part according to a first embodiment.

A reference sign 7 denotes a lower part. The lower part 7 is a member to be attached to a lower end portion of the pipette main body 1, and houses chip holder units 20 each including a chip holder 23 (FIG. 1). The chip holder units 20 are described below. FIG. 3 is a perspective view showing the inside of the lower part 7 according to the first embodiment. As shown in FIG. 3, the lower part 7 includes the shaft portion 71, the unit case 72, and the ejector cover 73.

The shaft portion 71 includes a feed shaft 711 to be joined to the feed screw 5 (FIG. 3). A lower end portion of the feed shaft 711 is integrated with the unit case 72, and an upper end portion of the feed shaft 711 is joined to a lower end portion of the feed screw 5 by a magnetic force or a removable engagement structure. A female thread is formed on an inner circumference of an opening of the shaft portion 71, and a male thread is formed on an outer circumference of a lower end portion of the pipette main body 1, and the lower part 7 can be screwed to and removed from the pipette main body 1.

(Unit Case)

The unit case 72 is provided inside the ejector cover 73 of the lower part 7 independently of the ejector cover 73, and is a housing that houses a plurality of chip holder units 20.

The unit case 72 has a double-case structure including a front-face-side case 72F and a rear-face-side case 72B, and FIG. 3 shows a state where the front-face-side case 72F is removed. The front-face-side case 72F and the rear-face-side case 72B are positioned and engaged with each other by concave and convex shapes provided at four positions in the cases.

Figure 4:
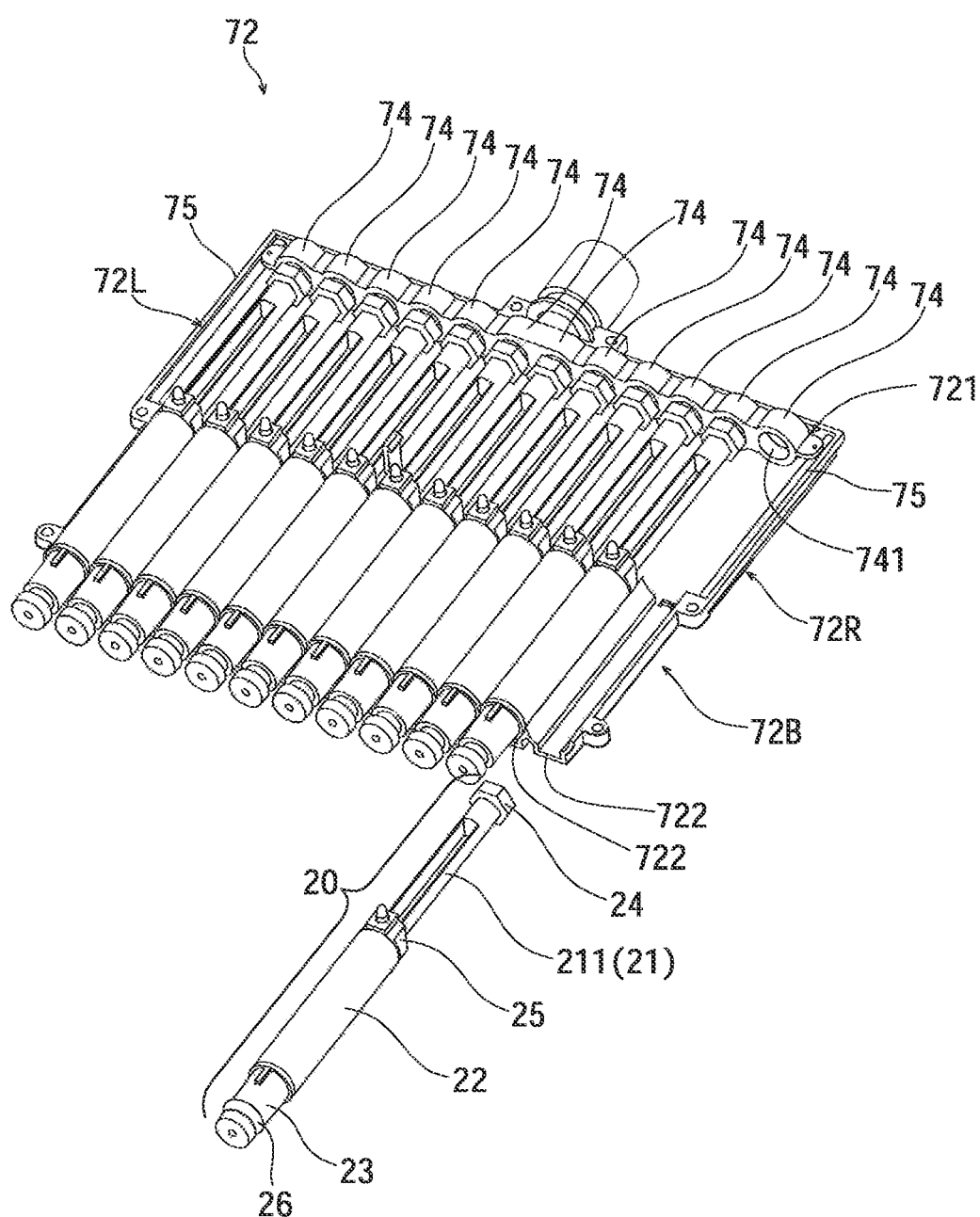
FIG. 4 is a perspective view showing a unit case and chip holder units according to the first embodiment.

FIG. 4 is a perspective view showing a unit case 72 according to the first embodiment. FIG. 4 also shows a state where the front-face-side case 72F is removed. As shown in FIG. 4, the unit case 72 of the present embodiment holds chip holder units 20 parallel in a direction (left-right direction) orthogonal to an axial direction (up-down direction) of the feed shaft 711. On a left side face 72L and a right side face 72R of the unit case 72, slide rails 75 are formed in upper regions. Between the slide rails 75 and 75, a movable portion 721 is provided. The movable portion 721 has guide portions on both ends, and moves on the slide rails 75 in the up-down direction. The guide portions of the movable portion 721 may have a form known to persons skilled in the art, such as a rail form or a bearing form.

In the movable portion 721, a plurality of to-be-connected portions 74 to connect the chip holder units 20 are formed in the left-right direction. Each to-be-connected portion 74 is a circular groove formed on a lower surface of the movable portion 721, and its inner surface has a magnet 741 (FIG. 4). In the present embodiment, to-be-connected portions 74 are formed at 12 positions at even intervals in the unit case 72 so that the attaching portion for chips 8 has up to 12 channels.

In lower regions of inner surfaces of the front-face-side case 72F and the rear-face-side case 72B of the unit case 72, a plurality of positioning frames 722 are formed in the left-right direction. The positioning frame 722 is a frame having a substantially U-shaped section stood to cover left and right sides of each cylinder 22 (described below) of the chip holder unit 20, and is formed for each width of the cylinders 22, and holds a circumferential surface of the cylinder 22 having a cylindrical shape. The positioning frame 722 functions as a positioner and a rotation stopper of the chip holder unit 20.

Figure 6:
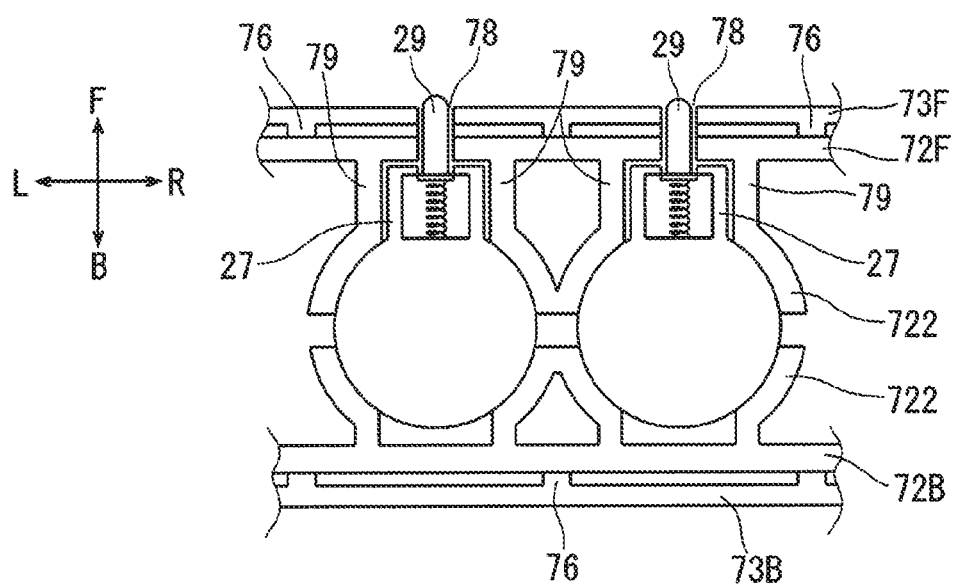
FIG. 6 is a cross sectional view of the lower part according to the first embodiment.

FIG. 6 is a cross sectional view of the lower part 7 according to the first embodiment. As shown in FIG. 6, front end portions of the positioning frames 722 of the front-face-side case 72F extend forward in plate shapes and become guide portions 79 extending in the up-down direction. A plurality of guide portions 79 are formed in the left-right direction at intervals substantially equal to widths of projecting engagement portions 27 described below of the chip holder unit 20 side.

The ejector cover 73 is a removing mechanism for the chips 8 as described above. The ejector cover 73 is formed of a double-case structure including the front-face-side cover 73F and the rear-face-side cover 73B (FIG. 2). The front-face-side cover 73F and the rear-face-side cover 73B are engaged with each other by fitting concave and convex shapes provided at four corners, and accordingly, they assume the form shown in FIG. 1. In the front-face-side cover 73F, switch window portions 78 to expose switches 29 described later of the chip holder units 20 from the front-face-side cover 73F are formed at 12 positions corresponding to the positions of the chip holder units 20 (FIG. 1). However, the switch window portions 78 may not be through holes as long as they have forms to allow pressing on the switches 29. As shown in FIG. 6, on inner surfaces of (the front-face-side cover 73F and the rear-face-side cover 73B of) the ejector cover 73, a plurality of reinforced walls 76 projecting to the unit case 72 side and extending in the up-down direction are formed in the left-right direction. By forming the reinforced walls 76, a bending stress to be applied to the ejector cover 73 when attaching or removing the chips 8 can be distributed in the up-down direction, and breakage of the ejector cover 73 can be reduced.

(Chip Holder Unit)

Figure 5:
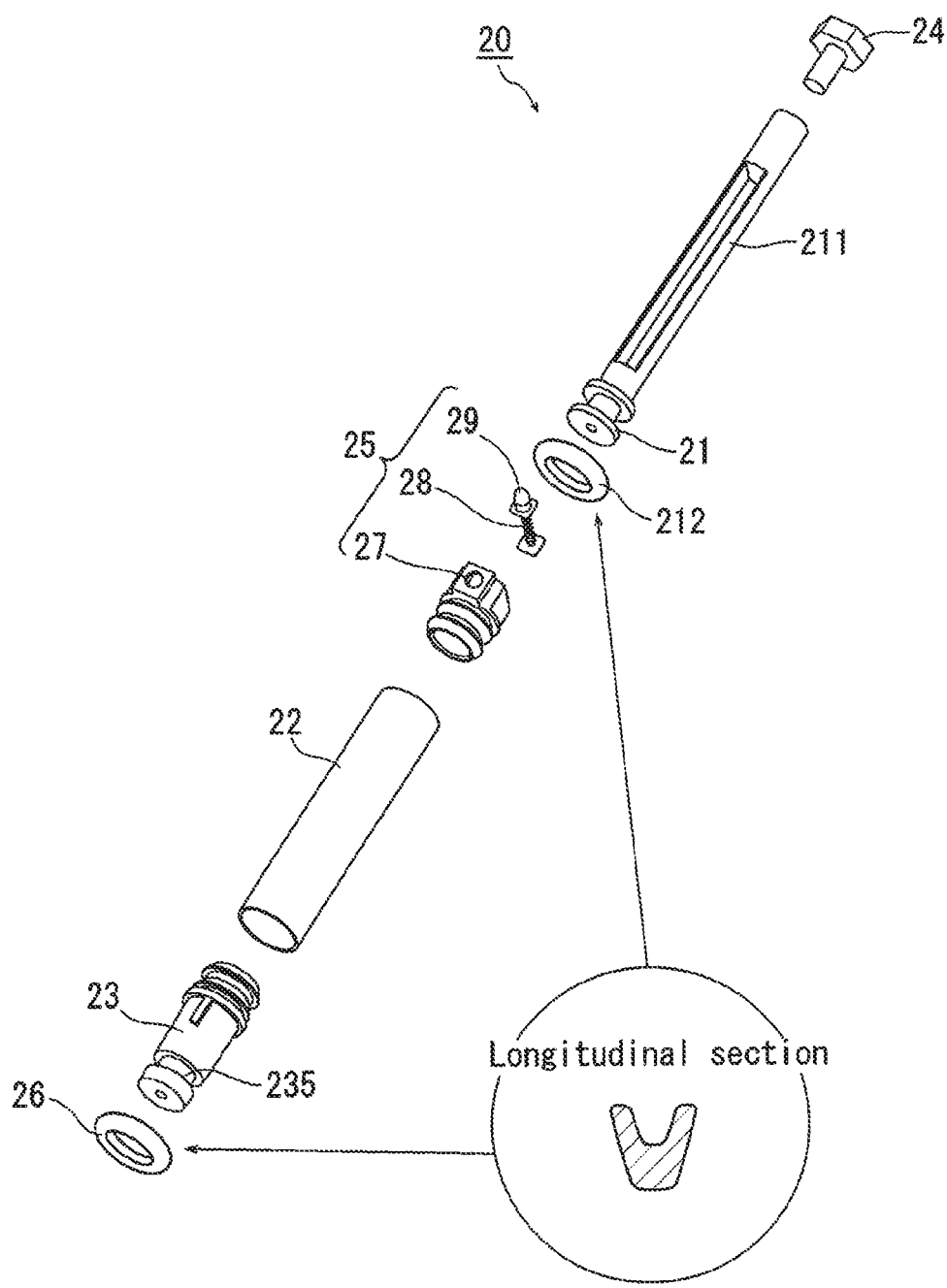
FIG. 5 is an exploded perspective view of the chip holder unit according to the first embodiment.

FIG. 5 is an exploded perspective view of a chip holder unit 20 according to the first embodiment. As shown in FIG. 5, the chip holder unit 20 includes a piston 21, a cylinder 22, a chip holder 23, a connecting portion 24, and a switch forming member 25.

The cylinder 22 includes a metal-made sleeve in a long thin and round cylindrical case. To a lower end portion of the cylinder 22, the chip holder 23 is attached. The chip holder 23 has a columnar shape, and on an outer circumferential surface slightly higher than a lower end portion of the chip holder 23, a concave groove 235 (FIG. 5) is formed. Into the concave groove 235, a lip packing 26 having a U-shaped longitudinal section is attached. The chip 8 is attached to the lower end portion of the chip holder 23, and a portion between the chip holder 23 and the chip 8 is liquid-tightly sealed by the lip packing 26. The packing used in this case may be an O-ring. By providing an O-ring or a lip packing 26 at the lower end portion of the chip holder 23, sliding resistance between the chip holder 23 and the chip 8 is reduced, and durability is improved. Using the lip packing 26 is more preferable since a tightening allowance range is extended, and accordingly, sealing performance is improved, and torsion is less likely to be caused by insertion of the chip 8. At an upper end portion of the chip holder 23, a concave-convex groove is formed on the outer circumferential surface, and this concave-convex groove enables the chip holder 23 to be press-fitted to and pulled out of and removed from a lower end portion of the cylinder 22.

To an upper end portion of the cylinder 22, a switch forming member 25 is attached. The switch forming member 25 has, as a whole, a cylindrical shape in which a piston shaft 211 described below is movable. At a lower end portion of the switch forming member 25, a concave-convex groove is formed on an outer circumferential surface, and this concave-convex groove enables the lower end portion of the switch forming member 25 to be press-fitted to and pulled out of the upper end portion of the cylinder 22. At an upper end side of the switch forming member 25, in a region of an outer circumferential surface, that is, in the present embodiment, in a region corresponding to an arc of substantially ⅙ of the outer circumference, a projecting engagement portion 27 projecting in a rectangular shape radially outward of the chip holder unit 20 is formed (FIG. 5). The projecting engagement portion 27 may be formed in a smaller region or larger region as long as the region is a region of the cylinder 22. The inside of the projecting engagement portion 27 is hollow, and this hollow portion is provided with a spring (elastic member) 28 and a convex switch 29 that is biased radially outward of the chip holder unit 20 by the spring 28. It is also possible that the switch 29 itself is made of an elastic member such as silicon rubber, or is biased by a structure to which another elastic function is added. The switch 29 is biased by the spring 28 so that its head portion projects outward from the projecting engagement portion 27 (FIG. 4).

As described above, in the front-face-side case 72F of the unit case 72, the guide portions 79 extending in the up-down direction are formed at intervals substantially equal to the widths of the projecting engagement portions 27 (FIG. 6). Accordingly, even after the chip holder unit 20 is removed from the unit case 72, the chip holder unit 20 can return to the original position since the projecting engagement portion 27 is guided in the up-down direction by the guide portions and positioned in the left-right direction by the positioning frame 722 of the unit case 72. The projecting engagement portion 27 and the guide portions 79 also function as rotation stoppers of the cylinder 22 having a cylindrical shape when the pipette is operated.

The piston 21 is provided at a lower end portion of the piston shaft 211 and inserted to the inside of the cylinder 22 via a piston lip packing 212 (FIG. 5). A sealing material is provided on an outer circumferential surface of the piston shaft 211, and the piston shaft 211 can reciprocate in the up-down direction inside the cylinder 22. To an upper end portion of the piston shaft 211, a connecting portion 24 is attached. The connecting portion 24 is an iron screw, and is press-fitted to the upper end portion of the piston shaft 211 and fixed to prevent coming-off. As described above, since the to-be-connected portion 74 of the unit case 72 has a magnet, the connecting portion 24 being an iron screw is connected to the to-be-connected portion 74 by a magnetic force.

In each chip holder unit 20, since the piston shaft 211 is connected to the movable portion 721 of the unit case 72 by a magnetic force, when the feed screw 5 is moved upward, the movable portion 721 of the unit case 72 is moved upward via the feed shaft 711, and the pistons 21 of the chip holder units 20 concurrently move upward inside the cylinders 22, and accordingly, a liquid is sucked into the chips 8. When the feed screw 5 is moved downward, pistons 21 of the respective chip holder units 20 concurrently move downward inside the cylinders 22, and accordingly, a liquid is discharged from the chips 8.

(Usage)

A usage of the multichannel pipette 100 constituted as described above is described. When a user wants to use the multichannel pipette 100, he/she attaches the number of chip holder units 20 that corresponds to the desired number of channels to be used to the lower part 7 according to a request for a number of wells, etc. As the number of chip holder units 20 (the number of channels) to be attached to the lower part 7, 12 channels being the maximum number in the present embodiment may be used, or 8 channels, 4 channels, 2 channels or an arbitrary number may be used. Channels do not necessarily have to be formed adjacent to each other, and may be formed to be spaced from each other. At this time, by magnetic connecting between the connecting portion 24 and the to-be-connected portion 74 of the unit case 72, the chip holder unit 20 can be easily attached to the lower part 7 (unit case 72).

When the chip holder unit 20 needs to be removed from the lower part 7, the switch 29 exposed from the window portion 78 of the lower part 7 (ejector cover 73) is pressed down to release interference between the window portion 78 and the unit case 72F, and the chip holder unit 20 is pulled out, and accordingly, the chip holder unit 20 can be released from the lower part 7 (unit case 72) through a one-touch operation.

Second Embodiment

In a second embodiment, the switch form between the chip holder unit 20 and the unit case 72 is changed from that in the first embodiment. Components that are the same as in the first embodiment are designated by the same reference signs, and description thereof is omitted.

FIG. 7 is a perspective view showing a unit case 72 and a chip holder unit 20 according to the second embodiment, FIG. 8(a) is a view showing a state where the chip holder unit 20 is removed from the unit case 72, FIG. 8(b) is a view showing a state where the chip holder unit 20 is attached to the unit case 72, and FIG. 8(c) is a view showing a state where interference between the chip holder unit 20 and the unit case 72 is released. The unit case 72 of the present embodiment also has a double-case structure consisting of a front-face-side case 72F and a rear-face-side case 72B, and a positioning frame 722 having a substantially U-shaped section holds a circumferential surface of a cylinder 22 having a cylindrical shape (FIG. 7). The positioning frame 722 functions as a positioner and a rotation stopper of the chip holder unit 20. In the unit case 72 of the second embodiment, on the left side face 72L and the right side face 72R thereof, slide rails 75 are also formed in upper regions, and between the slide rails 75 and 75, a movable portion 721 is provided. In the movable portion 721, to-be-connected portions 74 to which chip holder units 20 are connected are formed at 12 positions in the left-right direction.

In the second embodiment, switch forming members 25 are formed on an outer surface of the front-face-side case 72F of the unit case 72 (refer to FIG. 8. FIG. 7 shows a state where the rightmost row includes the switch forming member 25 and the chip holder unit 20 is attached thereto, and in other rows, descriptions of the switch forming members 25 and the chip holder units 20 are omitted).

The switch forming member 25 has a plate shape, and is turnable in the front-rear direction around a fulcrum portion 292 formed on an outer surface of the front-face-side case 72F, and at an upper end portion thereof, a convex switch 29 is provided, and at a lower end portion, an engagement hole 293 that engages with a chip-holder-side claw portion 251 described below is formed. On a rear surface side of the switch 29, between a rear surface of the switch forming member 25 and the unit case 72, a spring (elastic member) 28 that biases the switch 29 radially outward of the chip holder unit (forward of the pipette) is provided.

The chip holder unit 20 of the second embodiment also includes the piston 21, the cylinder 22, the chip holder 23, the connecting portion 24, and the lip packing 26 (FIG. 7). The chip holder 23 of the second embodiment has, on an outer circumferential surface of the chip holder 23, an interference portion 232 integrally formed from the chip holder 23. The interference portion 232 extends in a plate shape parallel to and at a predetermined distance from the outer surface of the chip holder 23 toward an upper end portion of the chip holder 23 from a position higher than the concave groove 235 of the chip holder 23, and has, on a front-side surface of a free end portion of the interference portion 232, a convex chip-holder-side claw portion 231. The interference portion 232 may be formed as a separate body that can be fitted to the outer circumferential surface of the chip holder 23.

In the present embodiment, in a similar manner as in the first embodiment, switch window portions 78 to expose switches 29 from the front-face-side cover 73F are provided at 12 positions on the front-face-side cover 73F of the lower part 7 although they are not shown in the drawings.

(Usage)

A usage of the multichannel pipette 100 according to the second embodiment is described. The chip holder units 20 are attached to the lower part 7 in a similar manner as in the first embodiment. In the present embodiment, when the chip holder unit 20 is attached to the lower part 7, as shown in FIG. 8(b), the chip-holder-side claw portion 231 and the engagement hole 293 of the unit case 72 engage with each other, and the chip holder unit 20 is accordingly prevented from coming off the unit case 72, so that the chip holder unit 20 cannot be removed from the unit case 72 by just pulling the chip holder unit 20.

To remove the chip holder unit 20, as shown in FIG. 8(c), the switch 29 is pressed by finger to release interference between the chip-holder-side claw portion 231 and the engagement hole 293. In this state, by pulling out the chip holder unit 20, the chip holder unit 20 can be released from the lower part 7 (unit case 72) through a one-touch operation.

Third Embodiment

In a third embodiment, the switch form between the chip holder unit 20 and the unit case 72 is changed from that in the first embodiment. Components that are the same as in the first embodiment are designated by the same reference signs, and description thereof is omitted.

Figure 10:
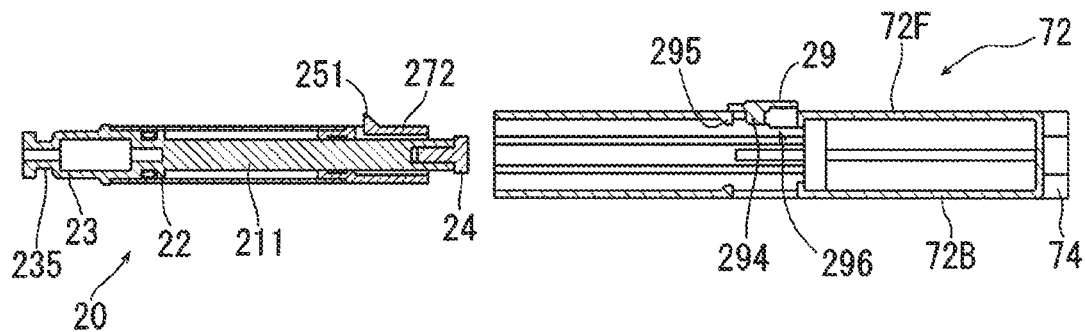
FIGS. 10 (a), (b) and (c) are sectional views describing interference between the unit case and the chip holder unit shown in FIG. 9.
Figure 10:
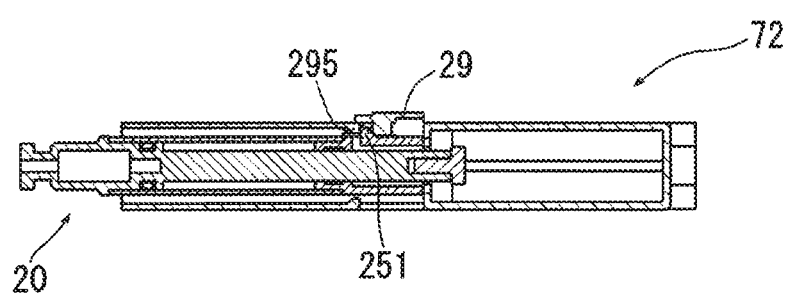
Figure 10:
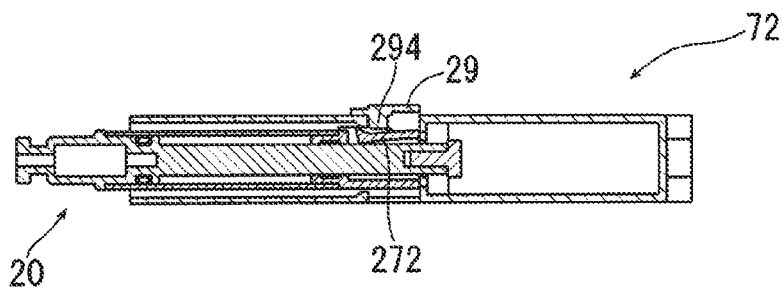

FIG. 9 is a perspective view showing a unit case 72 and a chip holder unit 20 according to the third embodiment, FIG. 10(a) is a view showing a state where the chip holder unit 20 is removed from the unit case 72, FIG. 10 (b) is a view showing a state where the chip holder unit 20 is attached to the unit case 72, and FIG. 10(c) is a view showing a state where interference between the chip holder unit 20 and the unit case 72 is released. The unit case 72 of the present embodiment also has a double-case structure consisting of a front-face-side case 72F and a rear-face-side case 72B, and a positioning frame 722 having a substantially U-shaped section holds a circumferential surface of a cylinder 22 having a cylindrical shape (FIG. 9). The positioning frame 722 functions as a positioner and a rotation stopper of the chip holder unit 20. In the unit case 72 of the third embodiment, on a left side face 72L and a right side face 72R thereof, slide rails 75 are formed in upper regions, and between the slide rails 75 and 75, a movable portion 721 is provided. In the movable portion 721, to-be-connected portions 74 to which chip holder units 20 are connected are formed at 12 positions in the left-right direction.

In the third embodiment, sliding switches 29 are formed on an outer surface of the front-face-side case 72F of the unit case 72 (Refer to FIG. 9. FIG. 4-9 shows a state where the rightmost row includes the switch 29, and a chip holder unit 20 is attached thereto, and in other rows, descriptions of the switches 29 and the chip holder units 20 are omitted).

12 switches 29 are provided in the left-right direction of the unit case 72. In a side surface of the front-face-side case 72F, openings 296 are provided, and the switches 29 are held slidably downward in the openings 296. Each switch 29 has a plate shape, and at a substantially central position of a rear face thereof, a pressing convex portion 294 convex radially inward of the chip holder unit 20 (rearward of the pipette) is formed. At a lower opening end portion of the opening 296, on a rear face thereof, a case-side claw portion 295 convex radially inward of the chip holder unit 20 (rearward of the pipette) is formed.

The chip holder unit 20 of the third embodiment also includes the piston 21, the cylinder 22, the chip holder 23, the connecting portion 24, and the lip packing 26. In the third embodiment, at an upper end portion of the cylinder 22, a switch receiving member 271 is formed. The switch receiving member 271 has a cylindrical shape as a whole in which a piston shaft 21 is movable, and at a lower end portion of the switch receiving member 271, a concave-convex groove is formed on the outer circumferential surface, and this concave-convex groove enables a lower end portion of the switch receiving member 271 to be press-fitted to and pulled out of and removed from the upper end portion of the cylinder 22. In a region of an outer circumferential surface of the switch receiving member 271, that is, in the present embodiment, in a region corresponding to an arc of substantially ⅙ of the outer circumference, a projecting engagement portion 27 projecting in a rectangular shape radially outward of the chip holder unit 20 (forward of the pipette in the present embodiment) is formed (FIG. 9). The inside of the projecting engagement portion 27 of the present embodiment is also hollow, and a front face of the projecting engagement portion 27 has a plate spring portion 272 formed by cutting in a chip holder unit axial direction. At a free end portion of the plate spring portion 272, a chip-holder-side claw portion 251 convex radially outward of the chip holder unit (forward of the pipette) is formed.

The positioning frame 722 of the third embodiment assumes a substantially U shape as a whole, and in detail, the positioning frame is formed so that a free end portion has a substantially V shape and a base end portion has a right angle. The free end portion holds the circumferential surface of the cylinder 22 and functions as a positioner of the chip holder unit 20, and the base end portion functions as a guide portion that guides the projecting engagement portion 27 in the up-down direction, and a rotation stopper.

In the present embodiment, in a similar manner as in the first embodiment, switch window portions 78 to expose switches 29 from the front-face-side cover 73F are provided at 12 positions on the front-face-side cover 73F of the lower part 7 although they are not shown in the drawings.

(Usage)

A usage of the multichannel pipette 100 according to the third embodiment is described. The chip holder unit 20 is attached to the lower part 7 in a similar manner as in the first embodiment. In the present embodiment, when the chip holder unit 20 is attached to the lower part 7, as shown in FIG. 10(b), the chip-holder-side claw portion 251 and the case-side claw portion 295 of the unit case 72 engage with each other, and the chip holder unit 20 is prevented from coming off the unit case 72, so that the chip holder unit 20 cannot be removed from the unit case 72 by just pulling the chip holder unit 20.

To remove the chip holder unit 20, as shown in FIG. 10(c), the switch 29 is slid downward. By this sliding, the pressing convex portion 294 of the switch 29 presses the plate spring portion 272 of the chip holder unit 20 and causes the plate spring 272 to warp. Accordingly, the engagement between the chip-holder-side claw portion 251 and the case-side claw portion 295 is released. In this state, by pulling out the chip holder unit 20, the chip holder unit 20 can be released from the lower part 7 (unit case 72) through a one-touch operation.

According to the first to third embodiments described above, by the constitution that makes each chip holder 20 removable alone from the lower part 7 by providing, on the lower part 7 (unit case 72), the to-be-connected portion 74, and providing, on each chip holder unit 20, a connecting portion 24 to be removably connected to the to-be-connected portion 74, the number of channels of the multichannel pipette 100 can be arbitrarily set.

Accordingly, according to accuracy and efficiency required for dispensing, expenses of a liquid to be dispensed, or an available amount of a sample to be dispensed, or the skill of a user and liquid properties, etc., chip holder units 20 that correspond to the number of the required number of channels are attached to the lower part 7, and therefore, a user can select the number of channels by himself/herself.

In addition, each chip holder unit 20 can be removable alone from the lower part 7, so that even when a chip holder 23 of any of the chip holder units 20 is worn and broken, a user can remove this trouble occurring chip holder unit 20 by himself/herself and replace only the chip holder 23. Therefore, the time and cost for repair of the pipette can be significantly reduced.

Next, a preferred modifications of the embodiment described above is described. All of the embodiments described above show a form in which the multichannel pipette 100 houses up to 12 chip holders 20 (up to 12 channels) in the unit case 72 by way of example, however, a changed form in which up to 8 chip holder units 20 (up to 8 channels) are housed, is also preferable. Besides this, the multichannel pipette 100 may have a form that houses up to 16 chip holder units 20 (up to 16 channels), up to 4 chip holder units 20 (up to 4 channels), or up to 2 chip holder units 20 (up to 2 channels). That is, the maximum number of channels of the multichannel pipette 100 may be arbitrary, and even when the number of channels is changed, the changed form is also included in the present invention.

In all of the embodiments described above, the to-be-connected portion 74 and the connecting portion 24 can be attachable to and removable from each other by magnetic connecting, however, they can also be attachable to and removable from each other even when the connecting method is changed to a combination of screws or claws. In all of the embodiments described above, the switches 29 are provided on the front-face-side (front-face-side cover 73F), however, they may be provided on the rear-face-side (rear-face-side cover 73B), or may be provided on both of the front face and the rear face so that the chip holder units 20 are prevented from coming off on both sides and the fixation strength is improved.

In all of the embodiments described above, an electric type in which the piston 21 is driven by an electric motor 6 is described by way of example, however, the invention is also applicable to a manual type in which the piston is manually driven. All of the embodiments described above may be applied to a single pipette.

Preferred embodiments and modifications of the present invention are described above, and each embodiment and each modification can be combined based on knowledge of a person skilled in the art, and such a combined embodiment is also included in the scope of the present invention.

REFERENCE SIGNS LIST

100 Multichannel pipette
1 Pipette main body
6 Motor (drive section)
7 Lower part
20 Chip holder unit
21 Piston
22 Cylinder
23 Chip holder
24 Connecting portion
25 Switch forming member
26 Lip packing
27 Projecting engagement portion
28 Spring (elastic member)
29 Switch
72 Unit case
74 To-be-connected portion
78 Switch window portion
49 Guide portion
231 Chip-holder-side claw portion
293 Engagement hole
294 Pressing convex portion
295 Case-side claw portion
296 Opening
711 Feed shaft (lower end portion of drive section)

The invention claimed is:

1. A multichannel pipette comprising:
a pipette main body that houses a drive section;
a lower part attached to a lower end portion of the pipette main body;
a unit case having a movable portion provided inside the lower part and joined to a lower end portion of the drive section, the movable portion having a plurality of to-be-connected portions; and
a plurality of chip holder units housed in the unit case and each including a piston, a cylinder in which the piston slides, a chip holder attached to a lower end portion of the cylinder, and a connecting portion attachable to and removable from any of the plurality of to-be-connected portions,
wherein each of the chip holder units has a convex switch that is biased by an elastic member radially outward of the chip holder unit and is formed on an outer circumferential surface of the chip holder unit, and
wherein a plurality of switch window portions to allow pressing on the switches are formed in the lower part.

2. The multichannel pipette according to claim 1, wherein each of the convex switches is provided on a switch forming member provided on the outer circumferential surface of the chip holder unit, a projecting engagement portion extending radially outward of the chip holder unit is formed on an outer circumferential surface of the switch forming member, and a plurality of guide portions that guide each of the projecting engagement portions in the up-down direction are formed on the unit case.

3. The multichannel pipette according to claim 1, wherein a lip packing having a substantially U-shaped section is provided at a lower end portion of the chip holder.

4. The multichannel pipette according to claim 1, wherein the connecting portion and the to-be-connected portion are connected by a magnetic force.

5. A multichannel pipette comprising:
a pipette main body that houses a drive section;
a lower part attached to a lower end portion of the pipette main body;
a unit case having a movable portion provided inside the lower part and joined to a lower end portion of the drive section, the movable portion having a plurality of to-be-connected portions; and
a plurality of chip holder units housed in the unit case and each including a piston, a cylinder in which the piston slides, a chip holder attached to a lower end portion of the cylinder, and a connecting portion attachable to and removable from any of the plurality of to-be-connected portions,
wherein switch forming members are provided corresponding to the chip holder units,
on each of the switch forming members, a convex switch to be biased by an elastic member radially outward of the chip holder unit is formed at one end portion, and an engagement hole is formed at another end portion,
on each of the chip holder units, a chip-holder-side claw portion that engages in the engagement hole at the time of biasing by the elastic member is formed, and in the lower part, a plurality of switch window portions to allow pressing on each of the convex switches are formed.

6. The multichannel pipette according to claim 5, wherein a lip packing having a substantially U-shaped section is provided at a lower end portion of the chip holder.

7. The multichannel pipette according to claim 5, wherein the connecting portion and the to-be-connected portion are connected by a magnetic force.

8. A multichannel pipette comprising:
a pipette main body that houses a drive section;
a lower part attached to a lower end portion of the pipette main body;
a unit case having a movable portion provided inside the lower part and joined to a lower end portion of the drive section, the movable portion having a plurality of to-be-connected portions; and
a plurality of chip holder units housed in the unit case and each including a piston, a cylinder in which the piston slides, a chip holder attached to a lower end portion of the cylinder, and a connecting portion attachable to and removable from any of the plurality of to-be-connected portions,
wherein openings, each having sliding switches, are formed corresponding to the chip holder units,
on a rear face of each of the sliding switches, a pressing convex portion that protrudes inwardly of the chip holder unit is formed, and on a rear face of an opening end portion of the opening in a sliding direction of each of the sliding switches, a case-side claw portion that protrudes inwardly of the chip holder unit is formed,
on each of the chip holder units, a chip holder-side claw portion that warps outwardly of the chip holder unit is formed, and each of the chip-side claw portions is engaged with each of the case-side claw portions, and
in the lower part, a plurality of switch window portions to allow pressing on each of the sliding switches are formed, and
by sliding each of the sliding switches, the pressing convex portion makes the chip-holder-side claw portion warp, and engagement between the chip-holder-side claw portion and the case-side claw portion is released.

9. The multichannel pipette according to claim 8, wherein a lip packing having a substantially U-shaped section is provided at a lower end portion of the chip holder.

10. The multichannel pipette according to claim 8, wherein the connecting portion and the to-be-connected portion are connected by a magnetic force.

* * * * *